Patented Dec. 22, 1953

2,663,694

UNITED STATES PATENT OFFICE 2,663,694

ALKYD MODIFIED SILOXANE COATING COMPOSITIONS

Ronald L. Millar, Chicago, Ill., assignor to The Glidden Company, Cleveland, Ohio, a corporation of Ohio No Drawing. Application September 1, 1949,
Serial No. 113,675

6 Claims. (Cl. 260—22)

This invention relates to improved synthetic silicone resin coating compositions, and relates particularly to varnishes and enamels prepared from polysiloxanol compositions cobodied with evanescent monocarboxylic-acid-modified alkyd compositions.

White enamel paints (as distinguished from vitreous enamels) which are highly resistant to discoloration, loss of gloss and other defects when subjected for prolonged periods of time to moderately elevated temperatures have long been sought. A few types prepared from synthetic resins have been found to exhibit moderate heat resistance, but as far as I am aware the best of such known products will endure only a few hours at temperatures of 500° F. without becoming noticeably discolored and without showing obvious signs of deterioration of the film, such as checking and loss of gloss. Polysiloxane coatings have been proposed for use as temperature-resistant vehicles, but such coatings become thermoplastic at elevated temperatures. Prior art attempts to modify such polysiloxane compositions with other types of organic film-forming materials, to overcome the thermoplastic characteristics of the polysiloxanes, have usually resulted in lowering the temperature resistance. I have now found, however, that suitably selected monocarboxylic-acid-modified alkyd resins can be cobodied with selected polysiloxanols to produce remarkably heat-resistant varnishes and enamels. Some of the white enamels prepared in accordance with the present invention have been found to remain undiscolored, glossy, hard and free of other defects after at least 100 hours at 500° F. I am aware of the British specification No. 583,754 of Bowman and Evans (December 30, 1946) relating to alkyd modified polysiloxane compositions, and it will be apparent from the following description of my invention that my compositions provide a notable advance therefrom. I am also acquainted with the as yet unsealed but open-to-inspection British application No. 29,237 of the Thomson-Houston Company in which fatty-acid-modified alkyds having free hydroxyls are heat reacted with silicon-bonded alkoxy-containing compositions, but it will be apparent that my coating compositions are specifically different in constitution.

It is an object of my invention to provide an improved alkyd modified polysiloxanol coating composition.

It is a further object to provide a modified polysiloxanol coating composition which at high temperatures ultimately provides a film composed essentially of silicones and which remains hard and glossy for long periods of time at temperatures as high as 500° F.

It is another object to provide a modified polysiloxanol coating composition which remains undiscolored for long periods of time at temperatures as high as 500° F.

It is another object to provide a coating composition from selected polysiloxanols which have been cobodied with monocarboxylic-acid-modified alkyd resins and which cobodied composition is heat-stable against discoloration due to thermal cracking or thermal decomposition.

These and other objects will be apparent from the following description of the invention.

As mentioned above, the unmodified polysiloxane resins which have been proposed in the past for use as heat-resistant films have been found to exhibit various shortcomings. They become soft and thermoplastic at elevated temperatures, have low adhesion characteristics, poor abrasion resistance, and inferior solvent resistance. Moreover, they are presently high in cost. Attempts have been made to modify polysiloxane resins with other organic film-forming materials, but it has been found that the modifying materials heretofore used have not been especially satisfactory. They induce discoloration in the film at high temperatures and induce film deterioration marked by checking or cracking, loss of gloss, etc. I have now found, however, that these disadvantages can be overcome by cobodying polysiloxanols with monocarboxylic-acid-modified alkyds of selected ingredients and proportions. The resulting coating compositions are of moderate cost and are remarkably heat-stable in that they remain hard and undiscolored, and exhibit good adhesion, good abrasion resistance, good solvent resistance, and good durability. The coating films so provided are characterized by the evanescent nature of the alkyd, and by their ultimate conversion to nearly alkyd-free silicone films.

The alkyds used in my invention are characterized by their ability, when cobodied with polysiloxanols, to resist decomposition at elevated temperatures into colored products. The products of decomposition are volatile and do not char. I have found that in order to secure this characteristic, the alkyd and the polysiloxanol must be formulated from carefully selected materials, and must be suitably proportioned. The type of alkyd which I employ is described in U. S. Patent No. 2,437,657, but for best results I have found that the following limitations should be observed. I prefer to use phthalic anhydride or phthalic acid as the polybasic acid. Other polybasic acids which are mentioned in the West and Enterline patent supra, and which boil or sublime above about 200° C., may be used, provided they are highly purified, or are synthetic acids. The synthetic acids are preferable to the purified natural acids. The polyhydric alcohols may be any of the di- to tetrahydric aliphatic or cyclic saturated alcohols or epoxy potential-alcohol compounds. For example, glycerol, pentaerythritol, trimethylol propane and trimethylol ethane are suitable. I especially prefer chemically-pure water white glycerine for best heat-stability. Small amounts of glycols may be used, but their volatility makes them less desirable. The monocarboxylic acids used to modify the alkyd must be saturated, nondrying branched or straight chain aliphatic acids, preferably of between 6 and 10 carbons inclusive, or aryl or aralkyl monocarboxylic acids having up to 11 carbon atoms, and they must be purified sufficiently to ensure the absence of non-benzenoid unsaturation. They need not be pure compounds within the limits stated, since mixtures of the specified acids may be employed. However, acids derived from natural sources are not as satisfactory as the synthetic acids, and I prefer the latter. Typical monocarboxylic acids which presently are available as synthetic materials are 2-ethyl hexoic nonanoic, tertiary butyl benzoic, and benzoic, and these acids may be used individually or in admixture. The total quantity of monocarboxylic acid should be such that its weight (for example) plus its chemical equivalent weight of polyhydric alcohol is between about 35% and 50% of the total weight of esters calculated thus: weight of monocarboxylic acid plus its chemical equivalent of polyhydric alcohol plus weight of polybasic acid plus its chemical equivalent of polyhydric alcohol. Thus the monocarboxylic acid ester is from about ⅓ to ½ of the total weight of theoretical esters in the alkyd. The ingredients of the alkyd should be proportioned so as to produce a product having a low acid number such as an acid number below about 50 on a solvent-free basis. This usually requires the use of an excess of polyhydric alcohol of as much as 24% but when processing methods are such that low acid numbers can be secured without any appreciable excess of polyhydric alcohols, the resulting alkyds are satisfactory.

The monocarboxylic-acid-modified alkyds described above may be cobodied with selected polysiloxanols in proportions such that the alkyd amounts to between about 90% and 25%, and the polysiloxanols amount to about 10% to 75%, by weight. I particularly prefer to use between 20% and 60% of the siloxanols.

Siloxanols suitable for the present invention and which are presently available commercially are hydrolysis and partial condensation products of compositions which have the average general formula $R_nSiX_{4-n}$, wherein R represents phenyl and methyl radicals and X represents halogen, and where $n$ has a value of between 1 and 1.7. Between 10 and 90 per cent of the organic radicals represented by R are phenyl radicals, and the remainder are methyl radicals. A mixture of silanes which has the average composition stated may be prepared from a plurality of silanes of the following types: silicon tetrachloride, phenyl trichlorosilane, methyl trichlorosilane, diphenyldichlorosilane, phenylmethyldichlorosilane, dimethyldichlorosilane, triphenylchlorosilane, diphenylmethylchlorosilane, phenyldimethylchlorosilane, trimethylchlorosilane. These monomers are employed in such relative proportion as to yield a mixture having the stated average composition and having the phenyl and methyl radicals within the stated relative range.

When such a mixture is hydrolyzed by reacting the mixed silanes with water in excess of that stoichiometrically equivalent to the amount necessary for hydrolysis, a portion of the hydroxyl radicals bonded to silicon resulting from the hydrolysis are condensed during the course of hydrolysis. This condensation produces siloxane bonds. By maintaining the temperature low during hydrolysis, the condensation can be held to a minimum. This results in a high percentage of hydroxyl in the siloxane which is produced. Condensation is promoted by heating, and is accompanied by a reduction in the amount of hydroxyl present. Condensation should not be permitted to proceed so far that the resin is no longer soluble in an aromatic hydrocarbon solvent such as xylene.

The siloxanols which are of utility in the present process are those which contain at least 0.45 per cent by weight of hydroxyl radicals based upon the weight of the siloxanol resin, and not more than one hydroxyl per silicon atom; that is, about 20%.

Preferred siloxanol resins for the present invention are those in which substantially each of the silicon atoms carries one or two organic radicals bonded thereto.

Thus the siloxanols which are employed are characterized by the silicon atoms thereof being bonded together by silicon-oxygen-silicon linkages, the remaining valences of said silicon atoms being satisfied by methyl, phenyl, and hydroxyl radicals, said siloxanol containing between 1 and 1.7 total methyl and phenyl radicals per silicon atom, of which methyl and phenyl radicals between 10 and 90 percent are phenyl radicals, and which siloxanol contains between 0.45 and 20 per cent by weight of said hydroxyl radicals.

The process of the invention is conducted preferably in an aromatic hydrocarbon solvent such as xylol or toluol. Xylol is preferred. The process is conveniently carried out in a vessel fitted with a device whereby the solvent which refluxes when the reaction mixture is heated is returned to the vessel while the water which is generated during the process and refluxes azeotropically with the solvent is removed from the sphere of the reaction. The heating is carried out at a temperature which ensures refluxing of the solvent, and is generally continued until the mass is brought to a point just short of gellation.

The cobodied mass may be thinned with additional solvent and applied as a coating composition with or without the addition of pigments. Various pigments may be added to the varnish to prepare enamels. For white enamels we prefer to use anatase titanium dioxide, but rutile titanium dioxide is also satisfactory. Cadmium colors (yellow, orange, red, etc.), phthalocyanine blue, carbon black, aluminum pigment and duPont's fast violet are examples of different chemically-inert color pigments which are suitable. Usual extender pigments may be used also; e. g., barium sulfate, mica, asbestine, etc.

Enamels made from the cobodied varnish exhibit good heat resistance, discolor almost imperceptibly, if at all, when heated for as long as 100 hours at 400° F. (or 100 hours at 500° F. in some embodiments) have good adhesion, good water, moisture, alkali and organic solvent resistance, have good electrical properties, and are not thermoplastic after being baked. This lack of thermoplasticity is a curious and outstanding characteristic of the cobodied coatings of my invention. The alkyd component of the composition, when applied as a coating by itself, is highly thermoplastic at the baking temperatures of 450° F. or 500° F. Likewise, the polysiloxanol compositions when cured alone at such temperatures are also thermoplastic. Yet the cobodied compositions prepared from those alkyd and polysiloxanol components produce a hard, non-thermoplastic film at the stated baking temperatures. Moreover, the film does not become thermoplastic in the course of time at such temperatures, even though the alkyd component gradually decomposes and is dissipated from the film. In the course of 100 hour tests which I have made, I have found that the alkyd component is dissipated to an extent of about 90% after 20 hours at 500° F., yet even then the remaining film composed largely of silicones remains hard, continues to exhibit good gloss, and continues to provide a durable, mar-resistant protective coating. The retention of gloss is another outstanding characteristic of the film, particularly when one considers that as the alkyd component is dissipated the pigment-binder ratio in the remaining film increases to well beyond the ratio at which a gloss would be obtained if only the polysiloxane binder were used.

In view of the evanescent nature of the alkyd component of my coating composition, it becomes apparent that it must originally be formulated so that no charring will occur during its thermal decomposition into volatile materials. Any such charring would, of course, cause discoloration and darkening of the film.

It will also be apparent that the alkyd component serves several useful purposes. It assists materially in providing a viscosity in the coating composition which permits a wet film of the desired thickness to be applied. After the wet film has been baked, the alkyd component in combination with the siloxane component produces a hard, non-thermoplastic film. When the coated product, such as a stove, goes into service, the high service temperatures induce thermal decomposition of the alkyd, and that decomposition in turn apparently induces a reconstitution or curing of the siloxane component such that the inherent thermoplastic character of the silicone material is suppressed during all of the initial 20-hour period. At the end of that time, when the alkyd is substantially all gone, the remaining undiscolored film has been so cured that it continues to be a hard, glossy, durable film capable of withstanding high temperatures for at least an additional 80 hours. In view of these surprising observations, it becomes apparent that the presence of the alkyd component is instrumental in developing properties in the baked film and in the ensuing nearly-alkyd-free silicone film which could not have been developed if the siloxanol had been applied alone.

The following examples illustrate the principles of my invention, and preferred modes of practising the invention.

*Example 1*

A monocarboxylic acid modified alkyd was prepared from the following materials:

2-ethyl hexoic acid _____ 141 g., 0.98 mol.
glycerine _____ 129.2 g., 1.405 mols.
phthalic anhydride _____ 178 g., 1.201 mols.
xylol _____ 32 g., 7.5% of batch.

The above materials were refluxed in a kettle equipped with a trap to separate the water azeotropically. After about 32 hours the acid number was 4.0. The batch was reduced to 70% solids (non-volatile matter) with xylol. The viscosity of the varnish was Y (Gardner-Holdt).

The alkyd so prepared was next cobodied with silicols, in the following proportions:

Per cent on solids basis
Alkyd _____ 657 g., 46%
Polysiloxanol solution [1] _____ 772 g., 54%

[1] The polysiloxanol solution was a xylol solution (70% NVM) of the hydrolysis and partial condensation product prepared from an equal molar mixture of phenyl trichlorosilane, methyl trichlorosilane, and monophenyl monomethyl dichlorosilane so as to produce a product having a total of 1⅓ methyl and phenyl radicals per silicon atom, an equal number of methyl and phenyl radicals and a hydroxyl content of 3.61% by weight of resin solids. This siloxanol was produced by hydrolyzing the said equimolar mixture by adding it to an agitated mixture of water and toluol. The water was employed in amount sufficiently in excess of that requisite for hydrolysis that the hydrogen chloride produced and dissolved in the excess water would give a 20 per cent by weight aqueous hydrochloric acid. The toluol was employed in amount to yield a 35 per cent by weight solution of siloxane resin in the toluol. The resin was transferred to xylol by adding enough xylol to yield a 70 per cent solution therein and removing the toluol by vacuum distillation.

The mixture was refluxed in a kettle equipped with a device for azeotropic distillation, separation of water and return of xylol to the kettle. After about 18 hours the viscosity reached Z6 (Gardner-Holdt) and the batch was cooled quickly to prevent loss of viscosity and was reduced to 50% non-volatile matter with xylol.

The resulting clear varnish had a color around 1–2 (Gardner), was stable in storage, and had good water, moisture, alkali and heat resistance, had good adhesion and dried fairly rapidly when baked (e. g. ½ hour @ 500° F.; 1 hour @ 450° F.). It is an excellent varnish for bare metal sanitary ware, electric wires and glass fiber insulation, exhibiting imperceptible impairment of properties or discoloration due to charring when heated for as long as 100 hours at 500° F.

The clear varnish was pigmented with anatase $TiO_2$ by grinding, to provide a ratio of resin solids to pigment of 2:1. Two ounces of a cobalt naphthenate solution (6% cobalt metal) per gallon were mixed in.

The white enamel so prepared was applied by brushing, and by spraying, to various test panels of metal and glass, and the panels were baked at 500° F. for ½ hour. Comparison tests of metal panels so prepared with like panels which were heated at 500° F. for 100 hours showed that the prolonged heating caused no appreciable discoloration of the film, did not destroy the gloss, made the film harder and slightly more brittle, and did not impair the continuity of the film, as by crazing, powdering, loss of adhesion, or otherwise, and did not impair the resistance of the film to water, acid, alkali or organic solvents.

Weight loss tests were run at 500° F. on the clear varnish, on the alkyd per se and on the polysiloxanol per se, with the following results:

| Material | Weight Loss in percent after Indicated Elapsed Time in Hours | | | | | |
|---|---|---|---|---|---|---|
| | ½ hr. | 1.5 hrs. | 2.5 hrs. | 11 hrs. | 23 hrs. | 27 hrs. |
| | Percent | Percent | Percent | Percent | Percent | Percent |
| Varnish | 18.0 | 27.5 | 31.1 | 41.0 | | 45.1 |
| Alkyd | 55.4 | 75.3 | 81.6 | 95.4 | | 97.6 |
| Siloxanol | 1.0 | 1.3 | 1.5 | | 2.3 | |

Example 2

|  | Parts |
|---|---|
| Phthalic anhydride | 148 |
| Water white glycerine @ 100% | 107.5 |
| 2-ethyl hexoic acid | 117.3 |

A mixture of the above ingredients was heated with agitation in an inert atmosphere to 425° F. and held for 8–10 hours, until an acid number of 4.0 was obtained. The resin was cooled and thinned with xylol to a viscosity of $Z_3$ (Gardner) at 70.0% non-volatile matter. The alkyd so prepared was next cobodied with the polysiloxanol of Example 1 in the following proportions:

|  | Percent on solids basis |
|---|---|
| Alkyd | 291 parts, 70% |
| Siloxanol solution | 125 parts, 30% |

The mixture was refluxed in a kettle equipped with a device for azeotropic distillation, separation of water and return of solvent to kettle. After 9–10 hours of reflux, the batch was reduced to 50% non-volatile material with xylol. The properties of the resulting varnish were:

| Viscosity | R (Gardner). |
|---|---|
| Color | 2 (Gardner). |
| Acid number | 1.4. |

This varnish was pigmented with Cadmium red and yellow and aluminum metal to an extremely light rose colored enamel which when baked at 525° F. for 20 minutes had fair luster and good hardness, flexibility and adhesion. The enamel was subjected to 500–550° F. for 48 hours and showed no change whatsoever.

Example 3

|  | Grams |
|---|---|
| Phthalic anhydride | 178.0 |
| Water white glycerine @ 100% | 129.1 |
| Tertiary butyl benzoic acid | 174.5 |
| Xylol | 47.0 |

The above materials were refluxed in a kettle equipped with a trap to separate the water azeotropically. After about 27 hours the acid number was 9.3. The batch was reduced to 70% non-volatile material with xylol. The properties of the varnish were:

| Viscosity | $Z_6$ (Gardner). |
|---|---|
| Color | 1–2 (Gardner). |
| Acid number | 7.4. |

The alkyd so prepared was next cobodied with polysiloxanols in the following proportions:

| Alkyd | 181.0 g., 46% | |
|---|---|---|
| Siloxanol solution [1] | 187.5 g., 54% | 65% NVM |
| Xylol | 66.5 g. | |

[1] Same as in Example 1, except that it was 80% NVM in xylol.

The mixture was refluxed in a kettle equipped with a device for azeotropic distillation, separation of water and return of xylol to the kettle. After about 11 hours at reflux, the batch was reduced to 50% non-volatile matter with xylol. The properties of the varnish were:

| Viscosity | T (Gardner). |
|---|---|
| Color | 1–2 (Gardner). |
| Acid number | 2.4. |

The resulting clear varnish was pigmented and cobalt naphthenate added as in Example 1. This enamel was applied by spraying to steel panels, and baked at 500° F. for ½ hour. The film showed excellent color and gloss retention at 500° F. for long periods.

Example 4

| Phthalic anhydride | 178 g., 1.201 mols. |
|---|---|
| Water white glycerine @ 100% | 105 g., 1.1 mols +4% excess. |
| Nonanoic acid [2] | 142 g., 0.898 mol. |
| Xylol | 43 g., 10% of batch. |

[2] $(CH_3)_3CCH_2CH(CH_3)CH_2COOH$.

The above materials were refluxed in a kettle equipped with a trap to separate the water azeotropically. After about 8 hours the acid number was 49.5. The batch was thinned to 60% non-volatile matter with xylol and the resulting varnish had the following properties:

| Viscosity | P (Gardner). |
|---|---|
| Color | 7 (Gardner). |
| Acid number | 35.3. |

The alkyd so prepared was cobodied with polysiloxanols in the following proportions:

|  | Percent on solids basis | |
|---|---|---|
| Alkyd | 213 g., 46% | |
| Siloxanol solution [3] | 200 g., 54% | 65% NVM |
| Xylol | 13 g. | |

[3] Same as in Example 1, except that it was 75% NVM in xylol.

The mixture was refluxed in a kettle equipped with a device for azeotropic distillation, separation of water and return of xylol to the kettle. After about 6 hours of reflux, the batch was almost gelled and 20 g. of butanol were added. The resulting varnish had the following properties:

| Non-volatile material | 65.0 (some slight loss of xylol during reflux). |
|---|---|
| Viscosity | X (Gardner). |
| Color | 5–6 (Gardner). |
| Acid number | 17.3. |

The clear varnish was reduced to 50% NVM with xylol and pigmented with anatase $TiO_2$ by grinding to provide a ratio of resin solids to pigment of 2:1. Two ounces of a cobalt naphthenate solution (6% cobalt metal) per gallon were added.

The white enamel so prepared was applied by spraying to various metal test panels and baked ½ hour at 500° F. These panels were subjected to intermittent heating at 500° F., i. e., one hour at 500° F. and one hour at room temperature, for a total actual time at 500° F. of 50 hours. At the end of this time no serious discoloration was noticeable, and the gloss was not destroyed. A slight amount of crazing became apparent after this period, due to the extreme thermal shock of alternate cycles at room temperature and 500° F. This method of heat testing is much more severe than heating continuously at 500° F., and demonstrates the superiority of my type of composition over straight polysiloxanes which have poor resistance to thermal shock.

Example 5

| | Parts |
|---|---|
| Phthalic anhydride | 148.0 |
| Water white glycerine @ 100% | 87.0 |
| 2-ethyl hexoic acid | 117.3 |

A mixture of the above ingredients was heated with agitation in an inert atmosphere to 400° F. and held for about 13 hours, until an acid number of 35.5 was obtained. The resin was cooled and thinned with xylol to a viscosity of Z4 at 70% non-volatile matter. The alkyd so prepared was next cobodied with polysiloxanols in the following proportions:

| | Per cent on solids basis | |
|---|---|---|
| Alkyd | 134 g., 46% | |
| Siloxanol solution [4] | 147 g., 54% | 50% NVM |
| Xylol | 129 g. | |

[4] The siloxanol solution was produced by hydrolyzing a mixture composed of monophenyl trichlorosilane 20%, monomethyl trichlorosilane 30% and phenylmethyl dichlorosilane 50%. The hydrolysis was carried out as described in Example 1 except that the resin was finally transferred to xylol so as to produce a 75% NVM solution. The hydroxyl content was 3.25% on resin solids.

This mixture was refluxed in a kettle equipped with a device for azeotropic distillation, separation of water and return of solvent to the kettle. After about 11 hours of reflux the batch was almost gelled and 20 grams of butanol were added. The resulting varnish had the following properties:

| | |
|---|---|
| Non-volatile matter | 50%. |
| Viscosity | G-H (Gardner). |
| Color | 3 (Gardner). |
| Acid number | 8.1. |

This varnish was pigmented and cobalt naphthenate added as in Example 1. The resulting enamel was applied by spraying to steel panels and baked at 500° F. for ½ hour. The film was characterized by excellent hardness, good gloss, color and color retention at 500° F. for long periods.

Example 6

Using the same alkyd as in Example 5, the following mixture was cobodied:

| | Per cent on solids basis | |
|---|---|---|
| Alkyd | 134 g., 46% | |
| Siloxanol solution [5] | 147 g., 54% | 65% NVM |
| Xylol | 33 g. | |

[5] The polysiloxanol solution was a 75% NVM solution in xylol obtained by hydrolyzing an equimolar mixture of monophenyl trichlorosilane, monomethyl trichlorosilane, and dimethyldichlorosilane. The hydrolysis was carried out as described in Example 1, to yield a product having an hydroxyl content of 2.61% on resin solids.

After refluxing for about 11 hours in a kettle equipped with a device for azeotropic distillation, separation of water and return of xylol to the kettle, the batch was thinned to 50% non-volatile matter with xylol. The resulting varnish had the following properties:

| | |
|---|---|
| Viscosity | D (Gardner). |
| Color | 2 (Gardner). |
| Acid number | 8.5. |

The clear varnish was pigmented and cobalt naphthenate added as in Example 2. The resulting enamel was applied to steel panels and baked for ½ hour at 500° F. The film was characterized by good hardness, excellent gloss and adhesion, and retention of these properties after prolonged heating at 500° F.

The foregoing examples should not be regarded as limitations on the invention, since it will be apparent that many embodiments of the invention beyond those illustrated are possible and are within the ability of one skilled in the art when guided by the principles and limitations set forth in the following claims.

Having disclosed my invention, what I claim is:

1. A coating composition particularly adapted to deposit baked films capable of enduring prolonged service at elevated temperatures without becoming discolored appreciably, said composition comprising a substantial amount of a vehicle composed essentially of an aromatic hydrocarbon solvent solution of a principal film-forming material, said principal film-forming material being a cobodied inter-reaction product of: (A) between 25 and 90 parts of a thermally-evanescent, substantially non-discoloring monocarboxylic-acid-modified alkyd having an acid number below about 50, said alkyd being the resinous reaction product of: (1) polycarboxylic acid which boils or sublimes above about 200° C.; (2) polyhydric alcohol selected from the group consisting of glycerol, pentaerythritol, trimethylol propane and trimethylol ethane; and (3) monocarboxylic acid selected from the group consisting of saturated aliphatic acids having from 6 to 10 carbon atoms and aryl and aralkyl acids having not more than 11 carbon atoms and free of non-benzenoid unsaturation, said monocarboxylic acid being present in an amount such that the total weight of monocarboxylic acid esters is between about ⅓ and ½ of the total weight of theoretical esters in the alkyd; and (B) between about 75 and 10 parts of a polysiloxanol, said polysiloxanol being characterized (1) by having its silicon atoms bonded together by Si—O—Si linkages, (2) by having the remaining valences of its said silicon atoms satisfied by methyl, phenyl and hydroxy radicals, (3) by having a total of between 1 and 1.7 methyl and phenyl radicals per silicon atom of which total between 10 and 90 per cent are phenyl radicals, (4) by having an hydroxyl content of between about 0.45% and 20% by weight of siloxanol solids, and (5) by being soluble in an aromatic hydrocarbon solvent; said film-forming material being produced by cobodying said alkyd and said polysiloxanol under reflux conditions with removal of water in an aromatic hydrocarbon solvent until a substantial increase in viscosity short of gellation has been secured.

2. A coating composition as claimed in claim 1 wherein said vehicle is essentially a xylene solution of said film-forming material; and wherein said cobodying under reflux conditions is carried out in xylene.

3. A coating composition as claimed in claim 1 wherein between 20 and 60 parts of said polysiloxanol are employed.

4. A coating composition as claimed in claim 1 which is pigmented with heat-stable pigments.

5. A coating composition as claimed in claim 4 wherein the vehicle/pigment ratio yields an enamel.

6. A coating composition as claimed in claim 5 wherein said polycarboxylic acid is phthalic anhydride, wherein said polyhydric alcohol is water-white chemically-pure glycerol, wherein about 54 parts of said polysiloxanol are employed, wherein the average number of organic radicals per silicon atom in said polysiloxanol is about 1⅓ and wherein the coating composition is characterized by forming a baked film (a) which becomes hard and glossy during baking and which thereafter remains hard although losing a major portion of its alkyd content when heated for about 20 hours at 500° F. and (b)

which is capable of enduring at least 100 hours at 500° F. without destruction of its integrity as a hard, glossy, undiscolored, serviceable and protective film.

RONALD L. MILLAR.

References Cited in the file of this patent

UNITED STATES PATENTS

| Number | Name | Date |
|---|---|---|
| 2,437,657 | West et al. | Mar. 9, 1948 |
| 2,502,286 | Sowa | Mar. 28, 1950 |
| 2,517,777 | Fenn et al. | Aug. 8, 1950 |
| 2,587,295 | Doyle et al. | Feb. 26, 1952 |

FOREIGN PATENTS

| Number | Country | Date |
|---|---|---|
| 532,532 | Great Britain | Jan. 27, 1941 |
| 583,754 | Great Britain | Dec. 30, 1946 |

OTHER REFERENCES

Paint, Oil & Chem. Review, November 11, 1948, pages 49–51.